W. J. PHELPS.
CAN FILLING APPARATUS.
APPLICATION FILED NOV. 7, 1910.
1,034,503.
Patented Aug. 6, 1912.
4 SHEETS—SHEET 1.
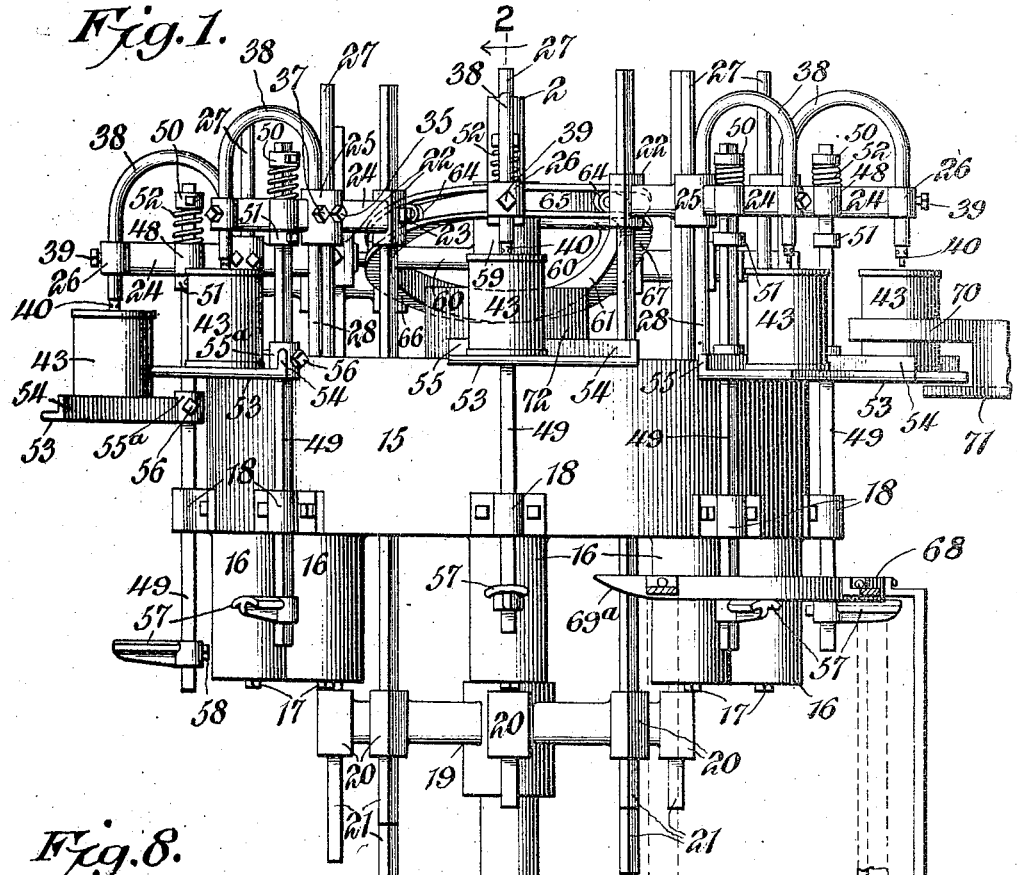
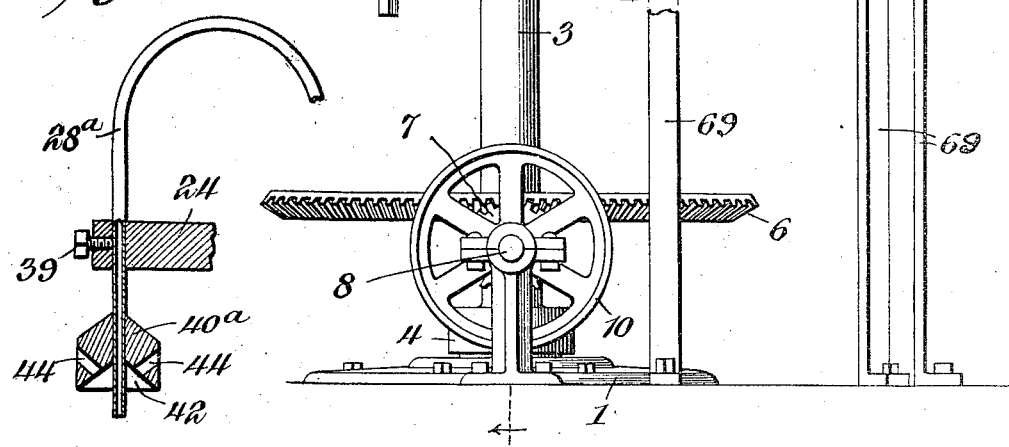
WITNESSES
Walter J. Phelps, INVENTOR,
BY
ATTORNEY

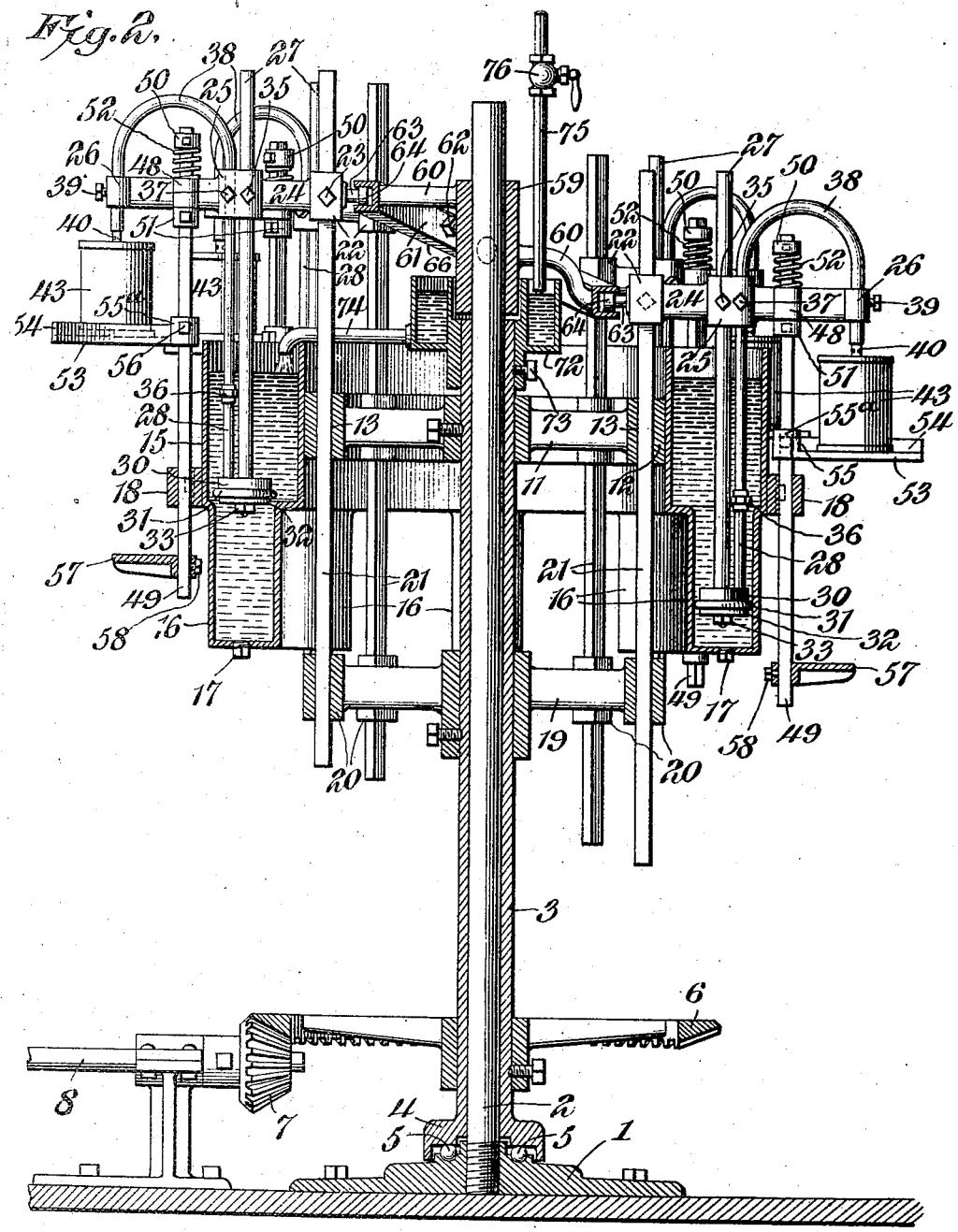

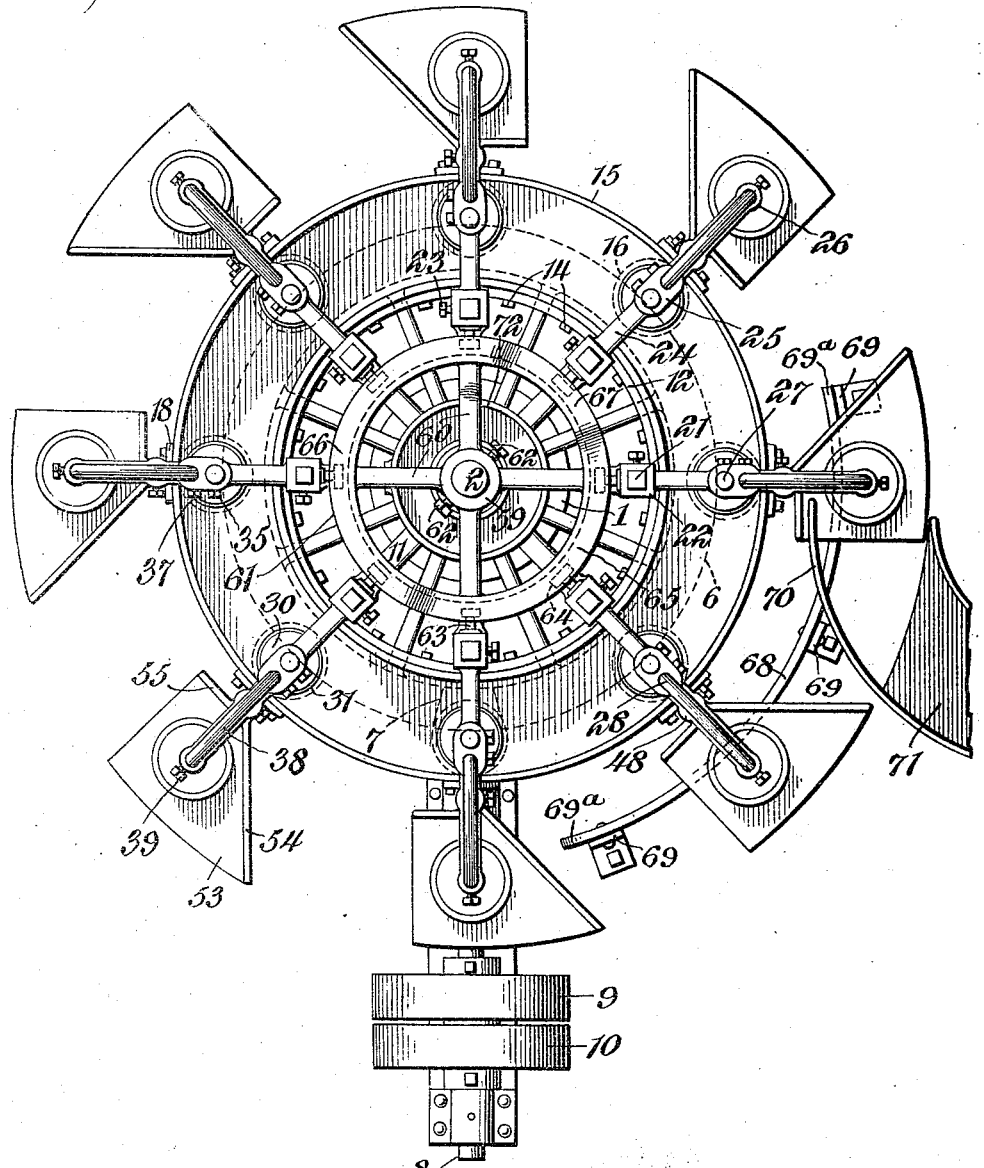

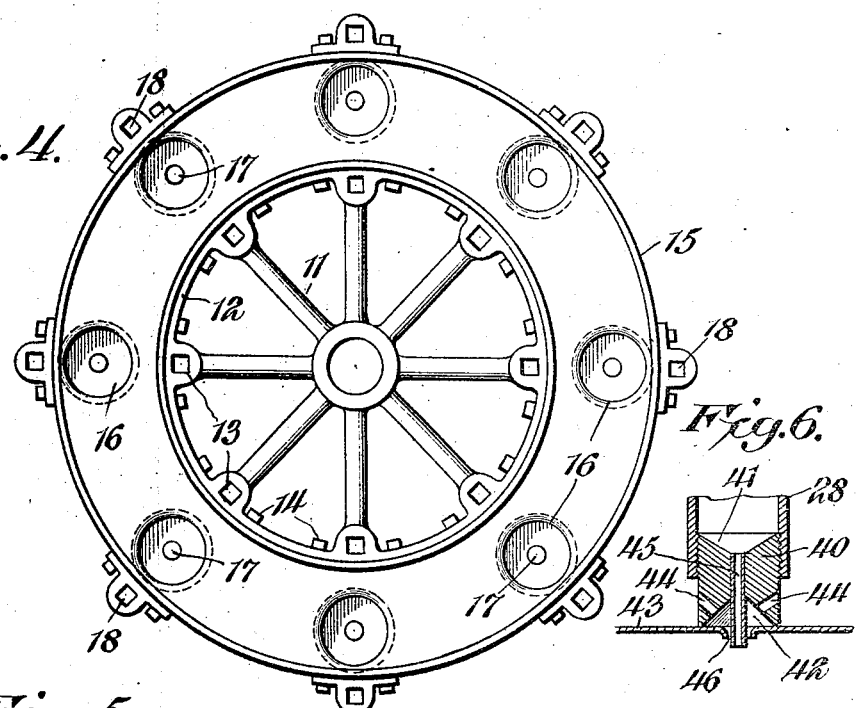
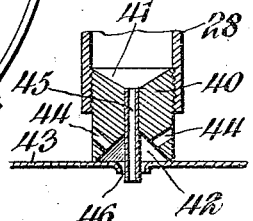
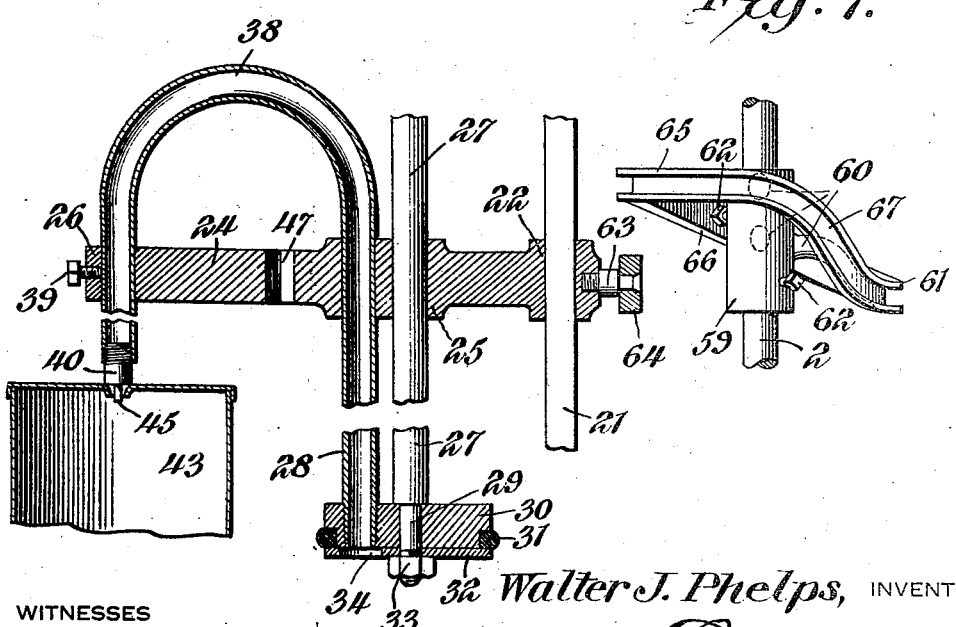

UNITED STATES PATENT OFFICE.

WALTER J. PHELPS, OF BALTIMORE, MARYLAND, ASSIGNOR OF ONE-HALF TO FRANK GEBBIE, OF ROCHESTER, NEW YORK.

CAN-FILLING APPARATUS.

1,034,503.

Specification of Letters Patent.  Patented Aug. 6, 1912.

Application filed November 7, 1910. Serial No. 591,134.

*To all whom it may concern:*

Be it known that I, WALTER J. PHELPS, a citizen of the United States, residing at Baltimore, State of Maryland, have invented a new and useful Can-Filling Apparatus, of which the following is a specification.

This invention has reference to improvements in machines for filling cans and is designed more particularly for the introduction of milk into cans, the milk being of the kind commonly known as evaporated milk, and the object of the invention is to provide a machine for the introduction of milk into cans which are entirely closed except for the presence of a small perforation in the center of the top of the can, such perforation being of a size to admit of ready sealing by a small drop of solder.

With cans of the character described the top may be made of one piece which at the time of forming has a small hole punched through the metal at the center thereof although under the exigencies of manufacture where the cans are made in great quantities there is a lack of exactitude in the position of such hole, so that there may be a variation of a few hundredths of an inch in the position of such hole with relation to the longitudinal axis of the can, the latter being of cylindrical form. Furthermore, the hole must be of small size, so that the closing of the hole by a small quantity of solder may be brought about without danger of any of the solder dropping through the hole into the interior of the can. This means that the free diameter of the hole should not exceed, say, about one-sixteenth of an inch, and the filling machine is therefore provided with milk conduits of a size which will pass through such hole and still permit the escape of air as the milk passes into the can without causing the deposition of any milk on that portion of the can top immediately surrounding the hole, so that the soldering operation is not interfered with and the necessity of cleansing the top of the can in order to permit the soldering is avoided.

Though the machine is designed more particularly for the filling of cans with milk, it may be used for filling cans with other liquids, and while in the following description it is assumed for the purposes of simplicity of description that milk is the liquid used, it will be understood that this term is employed as meaning not only milk, but any liquid material which may be desired to be introduced into cans.

The invention will be best understood from a consideration of the following detailed description, taken in connection with the accompanying drawings forming a part of this specification, and though the drawings show a practical embodiment of the invention, the latter may be otherwise embodied without sacrifice of any of the salient features of the invention.

In the drawings:—Figure 1 is an elevation of the machine with some parts in section and broken away. Fig. 2 is a section on the line 2—2 of Fig. 1 with some parts in elevation. Fig. 3 is a plan view of the machine. Fig. 4 is a plan view of the milk tank or reservoir. Fig. 5 is a section through one of the filling conduits and adjacent parts on a larger scale than the other figures. Fig. 6 is an enlarged diametric section of the can engaging end of the filling tube and showing a portion of a can in operative relation thereto. Fig. 7 is an elevation of the actuating cam as viewed from the right hand side of Fig. 1. Fig. 8 is a view of a portion of the discharge conduit for a pump where the conduit is of the same internal diameter throughout.

Referring to the drawings, there is shown a base plate 1 to which is secured a post 2, these elements constituting in the main the supporting means for the machine.

Mounted on the post 2 is a sleeve 3 extending for the greater portion of the length of the post and constituting a hollow shaft. In the ordinary operation of the machine, the post 2 is upright and the shaft 3 is, also, upright. The lower end of the shaft is expanded into a foot 4 between which and the base 1 are introduced balls 5 forming an anti-friction step bearing for the shaft 3. Near its lower end the shaft 3 carries a bevel gear wheel 6 driven by a bevel pinion 7 on a shaft 8, which latter may be taken as a drive shaft receiving power in any suitable manner as from a pulley 9, and mounted on this shaft may be a loose pulley 10, so that power may be applied to the shaft by a suitable belt through the tight pulley and the machine may be stopped by shifting the belt to the loose pulley, after the usual practice. The pulleys may, however, be taken as indicative of any source of power, whether directly connected to the shaft 8 or not, such features not being material to the present invention.

Applied to the shaft 3 near the upper end thereof is a spider 11 carrying at its periphery an annulus 12 by suitable spokes, and where the spokes join the annulus they are expanded to provide for passages 13 of non-circular contour, preferably square, or otherwise arranged.

Fast to the annulus or ring 12 of the spider 11 by bolts 14 or other suitable fastening means is an annular reservoir 15 into which milk may be introduced in a manner to be described, and it is from this reservoir that the milk is directed into cans. The top of the reservoir may be open and in the bottom there is formed a circular series of pockets 16 constituting the barrels of force pumps, as will hereinafter appear, and in the bottom of each pocket there is provided a plug 17 for cleansing purposes.

Arranged about the outer wall of the reservoir 15 are bearing blocks 18 preferably in the same radial lines as the passages 13 of the spider 11.

Below the spider 11 the shaft 3 carries another spider 19 having radial spokes terminating at the outer ends in heads 20 each provided with a passage in line with the passage 13 of a corresponding portion of the spider 11 and similarly shaped. Extending through each passage 13 and through the corresponding passage in a head 20 of the spider 19 is a rod 21, there being as many rods as there are passages 13 and heads 20, and these rods are shaped to conform to the passages through which they extend, the cross sectional shape of each rod 21 being indicated in the drawings as square, but any shape of rod may be used so long as provision is made to avoid movement of the rod about its longitudinal axis.

Each rod extends through a passage formed in a head 22, such head being secured to the rod by a set screw 23, and such head is formed on one end of an arm 24 formed at an intermediate point with a head or enlargement 25, and at the end remote from the head 22 with another head 26. Through the head or enlargement 25 are formed passages one for a piston rod 27 and the other for a pipe or conduit 28. The piston rod extends into the reservoir 15 and at the lower end has a stem 29 of reduced diameter, to which is fitted a piston 30, and this piston may be rabbeted to receive a packing ring 31 held to the piston by a plate or washer 32 in turn secured to the piston rod by a nut 33, the function of the washer 32 being to hold the packing ring 31 to the piston 30 and to expand the same by pressure thereupon due to the screwing of the nut 33 on the stem 29, the latter being appropriately threaded for the purpose. The pipe 28 passes through the piston to one side of the piston rod and is open at the end in matching relation to a passage 34 through the plate or washer 32 in order that liquid engaging the lower end of the piston as defined by the plate or washer 32 will find its way through the passage 34 into the pipe 28. The piston rod is made fast to the respective arm 24 by a set screw 35 or otherwise, and since, as will hereinafter appear, the arm 24 is given an up and down reciprocatory movement the piston rod 27 and piston 30 participate in such movement. The parts are so positioned that each piston 30 is movable into and out of a pump barrel 16 depending from the reservoir 15, the downward movement of the arm 24 causing the piston to enter the barrel and since no other outlet is provided, the contents of the barrel are thereby forced to find escape through the pipe 28 and when the piston is raised, air finds its way into the barrel 16 through the same pipe 28. The travel of the piston is sufficient to carry the same above the upper end of the barrel 16, so that milk within the reservoir may then gravitate into the barrel, the air drawn into the barrel through the pipe 28 by the lifting of the piston then finding escape around the space between the piston and the upper end of the barrel, through the mass of milk within the reservoir and finally out the top of the reservoir.

For convenience of assembling the pipe 28 is provided with an intermediate union 36 and where the pipe passes through the head 25 it is secured thereto by a set screw 37 or by other suitable means. Above the arm 24 the pipe 28 is bent into a goose-neck 38 and then carried through the head 26 and below the same, being held to the head 26 by a set screw 39 or by other suitable means. The end of the pipe where extending below the head 26 is threaded for the introduction of a plug 40 which is shown as a block recessed at the ends as indicated at 41, 42, the edges of the block surrounding the recess 42 being designed to engage the top of a can 43 under circumstances to be described, while extending from the recess 42 to the exterior of the block are short passages 44, and extending axially through the block is a pipe 45 of sufficient length to enter a can 43 through a perforation 46 therein when the lower end of the block 40 is in engagement with the outer surface of the top of the can, the length of the pipe 45 beyond the outer end of the block 40 being only sufficient to extend through the bur caused by the punching of the hole 46 in the top of the can.

The arm 24 between the heads 25 and 26 is provided with a passage 47, and the arm is there provided with an enlargement 48 to accommodate such passage. The passage 47 is traversed by one end of a rod 49 in turn traversing a corresponding bearing 18 on the outer wall of the reservoir 15. The rod 49 on opposite sides of the head 48 has fast thereto collars 50, 51, and between the head 48 and the collar 50 the rod 49 is surrounded by a spring 52. The movement of the rod 49 in one direction with respect to the arm 24 is determined by the collar 50 and spring 52, and in the other direction by the collar 51, the spring 52 being compressed as the collar 50 is moved toward the head 48 and the spring 52 tending to maintain the rod 49 in a position where the collar 51 is in engagement with the head 48. At a point between the bearing 18 and the collar 50 each rod 49 has applied thereto a shell 53 of a size to receive a can 43. One edge of the shelf, such edge being the rear or trailing edge considering the direction of rotation of the machine, which direction is clockwise, is at an angle to a radius including a corresponding rod 21, the piston rod 27, the pipe 28 and the rod 49. This angle or beveled edge is formed with an upturned flange 54, and another flange 55 may be formed at that edge of each shelf adjacent the reservoir 15. Each shelf is formed with an enlargement 55ᵃ provided with a passage for the rod 49, and the table is secured in any proper position on the rod 49 by a set screw 56.

Each rod 49 at an appropriate distance below the bearing 18 carries a finger 57 held to the rod by a set screw 58, such finger having its upper surface slightly curved transversely to the length of the finger for a purpose which will presently appear.

The post 2 is extended above the upper end of the hollow shaft 3 and there has fast to it a hub 59 from which radiate arms 60 carrying a channeled cam 61 of appropriate contour. This cam is endless and its channel portion is at all points equi-distant from the longitudinal axis of the post 2, but varies at different points in its circumference with reference to its height above the base 1. The cam is held to the post or standard 2 by a set screw 62, and since the post 2 is fixed relative to the other parts of the machine, the cam 61 is also likewise fixed.

The head 22 of each arm 24 has fast thereto a stud 63 carrying at its outer end a roller 64 and these rollers 64 are adapted to the channel portion of the cam 61, so as to travel therein.

The cam is for a portion of its length approximately horizontal, as indicated at 65, and from one end of this horizontal portion drops toward the base by a continuous decline 66 to its lowest point, and from this point approaches the other end of the horizontal portion 65 by an incline 67 steeper than the decline 66, but these parts will vary in machines of different sizes, so that no positive proportions of these parts can be given. The cam 61 is designed to impart motion to the arms 24 and the pistons 30 and pipes 28 carried thereby, and such motion is participated in by the shelves 53 except as will hereinafter appear. The horizontal portion 65 of the cam is designed to maintain the pistons 30 out of and above the pump barrels 17, so long as the rollers 64 are traveling in such horizontal portion of the cam. As soon as the declined portion 66 of the cam is reached, the arms 24 are moved downwardly, so that the pistons 30 enter the corresponding pump casings and the pipes 28 participate in this movement which is also participated in by the shelves 53, and this downward movement continues to the lowest point of the cam and then the arms 24 and parts carried thereby are lifted more rapidly than the downward movement until the rollers 64 again reach the horizontal portion 65 of the cam, and during the travel through this horizontal portion the parts are quiescent so far as vertical movement is concerned, except that the shelves are moved independently of the arms 24. This last named movement is brought about by means of a bar 68 held by standards 69 rising from the floor upon which the machine is installed, and this bar is curved about the vertical longitudinal axis of the machine so as to be in the path of the fingers 57 as the rotated parts of the machine are moved in the operation of the machine. The ends of the bar 68 are curved or beveled as shown at 69ᵃ, so as to readily override the fingers and force them to move to the under edge of the bar, along which they will travel during a portion of the rotative movement of the machine, the springs 52 yielding to this movement, while the arms 24 are held in their uppermost position by the horizontal portion 65 of the cam 61. At an appropriate point in the travel of the shelves 53 there is located a finger 70 positioned to override the shelves, but to engage the cans carried thereby and direct these cans in conjunction with the beveled flange 54 on to a run-way 71 to one side of the machine from which the cans may be taken either by hand or by a conveyer after the usual practice.

As shown in the drawings, Fig. 3, a can is approaching the finger 70, it being understood that the rotative movement of the machine is clockwise. The operator stands in a position approximately intermediate of the four and five o'clock positions if the showing of Fig. 3 be compared to a clock, so that the operator is between the run-way 71 and the pulleys 9 and 10. The shelf on reaching this position is maintained in the lowered position with the spring 52 compressed by the bar 68 which engages the finger of the shelf under consideration as the shelf approaches the run-way to discharge its can. There is ample room for the operator to place a can upon the empty shelf beneath the block 40 and then to lift the can so that the lower end of the pipe 45 enters the perforation 46 in the can and as the shelf then quickly rises under the action of the spring 52 when it reaches the beveled elevating end 69ª of the bar 68 the can top is brought into engagement with the block 40 with the tube 45 entering the can by way of the hole 46 and the can is clamped to the shelf by the action of the spring 52 through the block 40, the parts being properly proportioned for this purpose. As soon as the empty can has been carried a sufficient distance in the continued travel of the machine, the can support, the pipe 28 and piston 30 are moved downward by the action of the declined portion 66 of the cam 61 and milk within the pump casing 16 under consideration is caused to flow through the pipe 28 to and through the tube 45 and into the can, the movement of the piston being so timed that the milk is forced into the can, but not under such pressure as to cause foaming. It is to be noted that the movement of the piston in the active direction is a comparatively long continuous movement made necessary by the small size of the tube 45. The capacity of the pump casing 16 and the stroke of the pump piston determine the amount of milk which will pass into a can and as soon as the can has been filled to the proper height the withdrawing movement of the piston begins, but the shelf and can which participated in the downward movement also participate in the upward movement. Since the interior of the pump casing is closed except through the pipe 28 the withdrawal of the piston causes an inrush of air through the pipe. The only path for air to the pipe 28 is by way of the passage 46 in the can where not occupied by the tube 45 and thence by way of this tube to the pipe 28, the air reaching the passage 46 by way of the passages 44 in the block 40. Should, therefore, any milk have reached the top of the can immediately about the hole 46, the inrush of air through which hole 46 will draw such milk into the can, leaving the hole clean and any milk which when the down stroke of the pump ceased remained in the pipe 28 and tube 45 is drawn through these members to the interior of the pump casing 16 thus preventing any dribblings of milk from the tubes 45 when ultimately separated from the cans in which they have been introduced. As soon as the piston has been completely withdrawn from the pump casing or pocket 16, the air drawn thereinto finds escape around the piston through the body of the milk in the reservoir, and the pocket is quickly filled with a fresh supply of milk ready for the reintroduction of the piston and the driving of the milk into another can. By the time the piston has been withdrawn from the respective pocket, the finger of the shelf carrying the can under consideration has reached the bar 68, and the continued rotative movement of the machine causes the finger and the rod 49 carrying the finger to move downward for a limited distance against the action of the spring 52, thus likewise depressing the shelf 53 as before described and dropping the can away from the block 40 to an extent sufficient to completely withdraw the tube 45 from the can, so that the finger 70 may now act on the can to move it away from its shelf 53 on to the runway 71 and the empty shelf is by the continued rotative movement of the machine carried to a position in front of the operator, who now places a fresh can upon the shelf and directs it into position so that the tube 45 will enter the perforation 46 in the can whether such perforation be axial to the can or not, the operator, if necessary, lifting the can into engagement with the block 40 until the finger 57 rides from under the bar 68 and the spring 52 returns the shelf to its normal position, clamping the can against the block 40, after which the milk is driven from the reservoir into the can in the manner already described, the air within the can escaping through the hole 46 around the outer walls of the tube 45, the said tube being purposely smaller than the hole in the can or shaped to permit the escape of air through such hole outside the tube.

In order to maintain the supply of milk in the reservoir 15, an annular receptacle 72 is made fast to the upper end of the shaft 3 by a set screw 73, and from this annular vessel there leads a pipe 74 discharging into the reservoir. The vessel 72 participates in the rotative movement of the shaft 73 and milk may be introduced into this vessel through a pipe 75 provided with a valve 76, either continuously or intermittently, as may be desired. The valve 75 may be located within easy reach of the operator. Should it be necessary at any time to stop the machine, the operator may readily shift the belt from the tight to the loose pulley. It is desirable to cleanse the machine thoroughly after each day's run, and the milk may be withdrawn from the reservoir by removing the plugs 17, and if desired the pipes 28 may be separated at the unions 36 and those portions connected to the arms 24 may be removed therefrom by loosening the set screws 37 and 39 and all the parts may be thoroughly cleansed and sterilized by directing streams of steam against all parts necessary. Since absolute cleanliness is mandatory in machines of this character where milk is the liquid being filled into cans, the facility with which the machine may be cleansed and sterilized constitutes an important feature of the invention.

The machine is shown in the drawings as provided with eight pumps, each with a coacting filling tube and shelf for the can, but it will be understood that the machine is not limited to any particular number of such devices since it may be made as large as desirable to accommodate a greater number of cans at one time, in which case the speed of the machine may be correspondingly increased, while the speed of the pump plungers may be kept within the limits necessary to prevent foaming of the milk. By making the rotatable members of sufficiently great radial extent, it is possible to multiply the number of pumps and associated parts so that in one circular series two or more complete operations may be performed with a like number of operatives to supply the empty cans, the relations of the several parts being correspondingly arranged.

In the practical embodiment of the machine, the number of pumps and associated parts may be two or more times greater than shown in the drawings without exceeding the capability of a single operative maintaining the machine supplied with empty cans, the increased size of the machine not affecting the speed of the pump plungers or pistons to an extent to cause so rapid a movement of the milk into the can as to cause foaming.

It has been found in practice that by making the discharge conduit for the pump of the same small diameter as the tube 45 throughout its entire length, there are certain advantages over making the conduit of larger diameter than the nozzle or discharge end. With a tube small enough to enter the perforation usually provided in the top of a can, and still permit the escape of air through said perforation, even though the discharge end of the conduit be presented therein, there is sufficient adhesion of the milk to the walls of the tube and surface tension of the end of the column of milk at the outlet end of the tube to resist the entrance of air into the tube in a manner to permit the outflow of the milk lodged in the tube from the upper end of the goose-neck to the discharge end of the tube. If the conduit be of sufficient internal diameter at the discharge end, the weight of the milk above the discharge end of the conduit is sufficient to start an outflow of the milk and to establish an inflow of air, so that there is produced a stream of air entering the conduit and a corresponding outflowing stream of milk until the downturned end of the conduit is emptied of milk. The small outlet end of the conduit, whether in the form of the tube 45 or whether the conduit is of the same small diameter throughout, prevents the establishment of the opposing streams of milk and air, and the milk is, therefore, retained in that end of the conduit designed to enter the can, and the necessity of valves of any kind to prevent the outflow of milk is avoided, this being due also to the fact that the highest point of the conduit is above the highest level of milk within the reservoir. When the piston has completed its active stroke, there is an instant of rest, which, if the conduit were of large size, might start an outflow of milk due to the weight of the column of milk above the discharge end of the conduit, but the small size of the discharge end of the conduit, which is so small as to be substantially capillary will resist any such movement of the milk. When the piston is on its return or inactive stroke, air enters through the conduit, and particularly where the conduit is of small size throughout any milk remaining within the conduit is returned to the pump barrel except possibly some small amount which may still cling to the walls of the conduit. If such milk finds its way to the discharge end of the conduit it will not pass therethrough in the shape of dribblings because of the capillary attraction preventing the escape of such accumulations of milk from the discharge end of the conduit.

In Fig. 8 there is shown a conduit 28$^a$ having close to its nozzle or discharge end a block 40$^a$ like the block 40 shown in Fig. 6. This block has its end provided with the recess or concavity 42 and is of circular outline, and in one plane without break, so as to engage the top of the can at all points of the block, thus preventing any marring of the can as might occur were the passages 44 for the air in the form of notches in the bottom of the block, thus reducing the bearing area of the block upon the can.

The piston rod 27 and the conduit 28 or 28$^a$ are adjustable in the arm or carrier 24, and the shelf 53 is adjustable along the rod 49. This permits the active stroke of the piston 30 to be adjusted at will, this piston being designed to always move out of its pump barrel to permit the inflow of milk from the reservoir. By increasing the distance the piston moves above the pump barrel, the distance that it moves into the pump barrel is diminished and consequently the effective active stroke of the piston is correspondingly diminished, and the amount of milk discharged from the pump barrel is correspondingly smaller. By this means it is possible to adapt the same machine without change of stroke to the filling of cans of different capacity or of different heights, or both, with the assurance that the cans will each receive the predetermined amount of milk in the operation of the machine. As shown in Figs. 1 and 2 the extent of adjustability of the conduits 28 is somewhat limited, but in Fig. 5 the extent of adjustability is shown as indeterminate and may, therefore, be taken as showing the tube 28 of sufficient length to admit of the extreme adjustability needed for different lengths and sizes of cans.

What is claimed is:—

1. In a can filling machine, a pump having a liquid impelling member movable with relation to the barrel of the pump, a discharge conduit for the pump, a support for a can for holding the latter in operative relation to the discharge end of said conduit, and means connected positively to the liquid impelling member, the discharge conduit and the can support for causing simultaneous movement thereof with relation to the barrel of the pump.

2. In a machine for filling cans, a suitable reservoir, a series of pumps carried thereby and fed from the reservoir, said pumps being provided with reciprocatory pistons, fluid conduits each communicating through a respective piston with a respective pump and movable with said piston, a can support in operative relation to the discharge end of each conduit, and also movable with the respective pump piston, and means for imparting reciprocatory movement of predetermined character to each group of connected members in order.

3. In a machine for filling cans, a suitable reservoir, a series of pumps carried thereby and fed from the reservoir, said pumps being provided with reciprocatory pistons, fluid conduits each communicating through a respective piston with a respective pump and movable with said piston, a can support in operative relation to the discharge end of each conduit and also movable with the respective pump piston, and means for imparting reciprocatory movement of predetermined character to each group of connected members in order, said means comprising an actuating means for imparting rotative movement to the reservoir and to the pumps and connected reciprocatory parts associated therewith, and an impelling means for said reciprocatory parts acting in like manner upon the groups of reciprocatory parts in order.

4. In a machine for filling cans with liquid, a rotatable reservoir provided with pump-barrels depending therefrom, reciprocatory pistons one for each pump barrel, a carrier for each piston, means for imparting reciprocatory movement to the pistons by the rotative movement of the reservoir, liquid directing conduits each participating in the reciprocatory movement of a respective piston and adapted to communicate with the respective pump barrel through its piston, and can supports individual to and sustained by the carrier for their respective pistons.

5. In a machine for filling cans with liquid, a suitable reservoir for the liquid, pumps fed from said reservoir and each provided with a piston, liquid directing conduits individual to and participating in the stroke of each pump piston, and a can support individual to and also participating in the stroke of each pump piston and also having a range of movement independent of the pump piston.

6. In a machine for filling cans with liquid, a suitable reservoir for the liquid, pumps fed from said reservoir and each provided with a piston, liquid directing conduits, individual to and participating in the stroke of each pump piston, and can supports individual to and participating in the stroke of each piston and also movable independently of the said piston, the independent movement of a can support being of less extent than the movement of the can support with the piston.

7. In a can filling machine, a series of pumps including pistons, means for causing reciprocatory movement of the pistons, conduits for directing material from the pumps, can supports in operative relation to the discharge ends of the conduits, each conduit and can support individual to a respective piston being connected to said piston for simultaneous participation in the reciprocatory movement thereof, and means for causing the movement of each can support away from and toward the discharge end of the respective conduit independent of the movement of the respective piston under the actuating means therefor.

8. In a machine for filling cans, a pump provided with a reciprocatory piston, means for imparting to the piston an active movement sufficient to discharge the requisite amount of liquid to fill a can, liquid directing means participating in the reciprocatory movement of the piston and constituting a discharge conduit for the pump, and a can support having an extent of travel in the direction of the active stroke of the piston commensurate with such travel of the piston.

9. In a machine for filling cans, a pump provided with a reciprocatory piston, a discharge conduit for the pump participating in the reciprocatory movement of the piston, a can support, and connections between the latter and the piston whereby the can support participates in the reciprocatory movement of the piston to a like extent in both directions of the travel of said piston.

10. In a machine for filling cans, a pump provided with a reciprocatory piston, a discharge conduit for the pump connected to the piston for participation in the reciprocatory movement thereof, and a can support also connected to the piston for participation in the reciprocatory movement thereof to a like extent in both directions of the travel of the piston, said can support having means for causing a limited extent of travel of said can support toward and from the outlet end of the discharge conduit of the pump independent of the reciprocatory movement of the piston.

11. In a machine for filling cans, a pump provided with a reciprocatory piston, a discharge conduit for the pump participating to a like extent in the reciprocatory movement of the piston, a support for a can in operative relation and individual to the conduit and participating in the reciprocatory movement of the piston and conduit through a like extent of travel, said can support having a limited extent of travel toward and from the outlet of the discharge conduit of the pump independent of the movement of the piston and having a normal tendency toward said conduit.

12. In a machine for filling cans, a rotatable reservoir for liquid, a series of pumps carried by the reservoir and supplied thereby, each pump being provided with a reciprocatory piston, a discharge conduit for each pump participating in the movement of the piston, a support for a can in operative relation and individual to each discharge conduit and participating in the longitudinal movement of the conduit, said can support also being capable of limited movement independent of the conduit, means for imparting reciprocatory movement to the pistons and parts connected therewith during the rotation of the reservoir, and means for imparting to the can supports movements individual thereto during a predetermined portion of the rotative movement of the reservoir.

13. In a machine for filling cans, a rotatable reservoir, a series of pumps carried thereby each provided with a reciprocatory piston and a discharge conduit movable with the piston, a can support movable with the piston and discharge conduit and in operative relation to the latter and also having an extent of movement to and from the discharge conduit independent of the movement of the piston, means for imparting to the pistons in order active and return movements by the rotative movement of the reservoir, said actuating means being neutral to the pistons during a predetermined portion of the rotative movement of the reservoir, and means active to the can supports to move them independently of the reciprocatory movement of the pistons during the period of the rotative movement of the reservoir when the pistons are quiescent.

14. In a machine for filling cans, an annular reservoir having depending pump barrels thereon, a rotatable support for the reservoir to which the latter is secured and with which it rotates, reciprocatory pistons within the reservoir in operative relation to the pump barrels and movable into and out of the same, a support for each piston, guides for the support, a discharge conduit for each pump carried by the piston and its support and movable therewith, a supporting rod carried by each piston support and movable therewith and having a limited extent of movement independent of the support, a can receiving shelf carried by the said supporting rod, means for constraining the supporting rod for the can carrying shelf in a direction to move the shelf toward the outlet end of the pump discharging conduit, a cam acting on each piston carrier in order to cause a reciprocatory movement of the piston with an intermediate period of quiescence, a projecting member on each can supporting rod, and a fixed actuating member in the path of the projecting members on the can supporting rods for causing a movement of the can supporting rods independent of the pistons while the latter are traversing that portion of the line of travel where they have no reciprocatory movement.

15. In a can filling machine, a conduit for directing fluid through a single orifice in one head of the can, said conduit having a terminal portion adapted to engage the head of the can about the single orifice, said terminal portion being in normally fixed relation to the conduit and having a cavity with passages leading therefrom to the exterior of said terminal portion, and a central tube projecting beyond the plane of the can engaging end of the terminal portion of the conduit.

16. In a machine for filling cans each provided with a single small filling orifice in one head, a liquid directing conduit provided with a terminal block in normally fixed relation to the conduit and having a cavity in one end with passages leading therefrom to the exterior of the block, said block being shaped about the cavity to provide a plane can engaging portion adapted to contact with the head of the can about the filling orifice, and a tube extending axially through the block in fixed relation thereto and beyond the plane of the can engaging end of the block and of a diameter to enter the filling passage in the can.

17. In a machine for filling cans, a rotatable annular reservoir carrying pumps, each with a reciprocatory piston, a discharge conduit for each pump moving with the piston, can supports one for each pump in operative relation to the outer end of the respective conduit and also movable with the piston and having a limited extent of movement independent of the piston, a rotatable carrying member for the reservoir, a fixed supporting member for the rotatable member, a cam carried by the fixed member, means connected with each pump piston for engaging the cam to actuate the pump piston in accordance with the conformation of the cam, means for operating the can supports independently of the piston at a predetermined point in the rotative movement of the reservoir and pumps, and a rotatable liquid receiving vessel carried by the rotatable member in turn carrying the reservoir and having a liquid conveying connection with the interior of the reservoir.

18. In a can filling machine, a liquid directing conduit, and a can support in normally constant relation thereto, and means for causing a movement of the conduit and can support in the direction of the longitudinal axis of a can lodged on the support between the same and the conduit during the filling operation to an extent proportionate to the depth to which the liquid is to be fed to the can.

19. In a can filling machine, a liquid directing conduit, and a can support in normally constant relation thereto, means for causing a movement of the conduit and can support in the direction of the longitudinal axis of a can lodged on the support between the same and the conduit during the filling operation, and means for causing movement of the can support away from the conduit to release a can lodged therebetween at the termination of the filling operation.

20. In a can filling machine, a liquid directing conduit and a support for a can coöperating to grip a can between them with the conduit entering the can through a perforation therein, means for imparting orbital movement to the conduit and can holder, and means for causing a progressive movement to the conduit and can holder with a can lodged therebetween in the direction of the longitudinal axis of such can.

21. In a can filling machine, a liquid directing conduit and a support for a can coöperating to grip a can between them with the conduit entering the can through a perforation therein, means for imparting orbital movement to the conduit and can holder, means for causing a progressive movement of the conduit and can holder with a can lodged therebetween in the direction of the longitudinal axis of such can, and means for causing a movement of the can holder independent of the liquid conduit and away therefrom at the termination of the filling operation.

22. In a can filling machine, a liquid directing conduit and a support for a can coöperating to grip a can between them with the conduit entering the can through a perforation therein, means for imparting orbital movement to the conduit and can holder, means for causing a progressive movement of the conduit and can holder with a can lodged therebetween in the direction of the longitudinal axis of such can, and means for causing a movement of the can holder independent of the liquid conduit and away therefrom at the termination of the filling operation, and for causing the return of the can holder to its normal relation to the conduit subsequent to the movement of the can holder away from the conduit.

23. In a can filling machine, a reciprocable piston, liquid conduit and can support joined for simultaneous movement.

24. In a can filling machine, a reciprocable piston, liquid conduit and can support joined for simultaneous movement, the can support having a limited range of movement independent of the combined movement of the said members.

25. In a can filling machine, a reciprocable piston, liquid conduit and can support joined for simultaneous movement, the can support being mounted for limited independent movement relative to the other members and having a normal constraint to maintain a predetermined relation thereto.

26. In a can filling machine, an annular reservoir for liquid having a circular series of depending pump barrels, an axial support for the reservoir, means for rotating the reservoir about the axial support, a pump piston for each pump barrel, a liquid conduit carried by each pump piston and having its discharge end exterior to the reservoir, a support for each pump piston, guide members for the support constraining it to move in a direction to carry the pump piston into and out of the respective pump barrel depending from the reservoir, said guides being fast to and participating with the parts carried thereby in the rotative movement of the reservoir, a fixed operating cam acting on the piston supports to impart reciprocatory movement thereto, a can support sustained by each piston support and movable therewith to a commensurate extent, each can support having an independent limited range of movement in the piston support, and means for causing the independent movement of each cam support at a predetermined point in the rotative movement of the reservoir.

27. A can filling machine comprising a supporting post, a hollow shaft mounted thereon, means for imparting rotation to the shaft, an annular reservoir mounted on the shaft and rotatable therewith, said reservoir carrying a circular series of depending pockets constituting pump barrels, pistons one for each pump barrel, a carrier for each piston, a longitudinally movable guide rod for the carrier, guides for the rod in fixed relation to the rotatable shaft, an actuating cam for the piston supports in normally fixed relation to the post or standard and acting to cause reciprocatory movement of the pistons in order as the reservoir and piston supports are rotated, discharge conduits for the liquid, each conduit being carried by a respective piston and each conduit terminating in a discharge nozzle adapted to a small perforation in the cover of the can to be filled, a rod carried by each piston support and having a limited range of movement therein, a spring on each rod constraining it to one limit of its range of movement in the support, a shelf carried by each spring constrained rod in operative relation to the nozzle of a corresponding liquid conduit and adapted to hold a can in position with the conduit nozzle in the perforation in the can, and operating means for the spring constrained rods in the path thereof to cause a movement of each rod in order independent of the member carrying it at a predetermined point in the rotation of the rotatable parts of the machine.

28. In a can filling machine, a rotatable series of can supports, means for imparting orbital movement to said supports, means for imparting longitudinal movement to each can support in the direction of the longitudinal axis of a can lodged thereon, and means other than the last named means for imparting to the can support a movement in the direction of the longitudinal axis of a can lodged thereon.

29. In a can filling machine, a reservoir, pump barrels communicating therewith, a piston for each pump, a discharge conduit for each pump, actuating means for the piston carrying the same and the discharge conduit, both the piston and the discharge conduit being in adjustable relation to the actuating means, and a can support for each discharge conduit in operative relation thereto and adjustable to and from the said conduit.

In testimony, that I claim the foregoing as my own, I have hereto affixed my signature in the presence of two witnesses.

WALTER J. PHELPS.

Witnesses:
 JOHN H. SIGGERS,
 E. G. SIGGERS.

---

Copies of this patent may be obtained for five cents each, by addressing the "Commissioner of Patents Washington, D. C."